United States Patent [19]

Carothers et al.

[11] 3,770,173

[45] Nov. 6, 1973

[54] APPARATUS FOR AUTOMATICALLY BREAKING OUT A SCORED GLASS BRACKET

[75] Inventors: David B. Carothers, Ellwood City; Edward W. Rearick, Gibsonia; Lemuel R. McBride, Zelienople, all of Pa.

[73] Assignee: Billco Manufacturing, Inc., Zelienople, Pa.

[22] Filed: Sept. 11, 1972

[21] Appl. No.: 287,972

[52] U.S. Cl. .................................. 225/2, 225/96.5

[51] Int. Cl. .................................. C03b 33/04

[58] Field of Search .................. 225/2, 96.5, 93, 225/96

[56] References Cited

UNITED STATES PATENTS

| | | | |
|---|---|---|---|
| 1,988,565 | 1/1935 | Owen | 225/96.5 |
| 2,259,765 | 10/1941 | Morris | 225/93 |
| 2,316,532 | 4/1943 | Owen | 225/93 |
| 2,908,936 | 10/1959 | Kilborn | 225/93 X |
| 3,222,963 | 12/1965 | Nabiullin et al. | 225/96.5 X |
| 3,532,259 | 10/1970 | Augustin et al. | 225/2 |

*Primary Examiner*—Frank T. Yost
*Attorney*—Walter G. Sutcliff

[57] ABSTRACT

An apparatus for breaking out a prescored glass pattern from a glass bracket or plate which includes means for supporting the glass bracket upon an aligned template which is slightly larger than the prescored pattern. A weighted, pliable, elongated roller is rotatably movable across the supported glass bracket to cleanly break out the prescored pattern with very straight and smooth edges.

14 Claims, 4 Drawing Figures

48
50
52
54
14
46
44
28
24
34
32
30
16
10
18
20
70
72
26
68
22
58
40
12
16
56
14
48

48
48
48
48
10
28
32
38
36
70
64
60
62
60
66
66
40
42

APPARATUS FOR AUTOMATICALLY BREAKING OUT A SCORED GLASS BRACKET

BACKGROUND OF THE INVENTION

The present invention relates to the glass cutting art and more specifically the breaking out of prescored glass patterns from a larger plate or bracket of glass.

In manufacturing glass, large plates or brackets of glass are formed and later cut and patterned to the desired useable form, such as for automobile windows involving a variety of shapes and configurations which traditionally are changeable from year to year. Whenever a glass pattern is cut from the larger glass bracket it is desirable to be able to make a clean break so that the periphery of the cut-out or broken-out pattern has smooth peripendicular edges. This obviates the need for expensive and time consuming finishing operations which are required if the edge of the glass pattern is flaked or chipped.

In general, it is well known that in breaking out glass patterns it is desirable to apply a pressure to the prescored portion of the glass which may be disposed upon a template in order to flex the glass with a reaction very similar to hand breaking of glass. A method of applying a uniform breakout fluid pressure to a prescored glass pattern is detailed in U.S. Pat. No. 2,291,451. The method and apparatus detailed in this prior art teaching is to use a hinged press head with the underside of the press head being a fluid chamber with a flexible diaphragm wall, which is pressed down upon a supported glass bracket when the hinged press head is pivoted into engagement with the glass bracket. The fluid chamber is then filled with fluid to apply a uniform breakout pressure to the entire glass bracket. The fluid is thereafter drained from the pressure chamber and the press head pivoted out of the way to permit removal of the broken-out glass pattern.

Prior art breakout techniques also teach the use of two members, one on each side of the glass bracket, with at least one member acting against the glass and the other member to applying a bending moment to the glass along the score line.

SUMMARY OF THE INVENTION

The present invention is an automatic glass breakout apparatus for breaking out a prescored glass pattern from a glass bracket. The apparatus comprises a support table having a generally horizontal top surface adapted to support a rigid breakout template which is patterned slightly larger than the prescored pattern on the glass bracket. Means are associated with the support table for aligning and retaining glass bracket relative to the template disposed upon the support table. A pliable, elongated roller is mounted above the support table, and is connected to means for rotatably moving the roller across the glass bracket in contact with the glass bracket, whereby the prescored glass pattern will breakout cleanly and smoothly from the glass bracket.

The support table preferably includes an integral resilient conveyor means upon which the glass bracket is supported which conveyor means facilitates loading, and unloading of the glass bracket from the breakout apparatus, as well as facilitating positioning of the glass bracket over the template which is preferably supported below the resilient conveyor means.

DESCRIPTION OF THE PREFERRED EMBODIMENT

Figure 1:
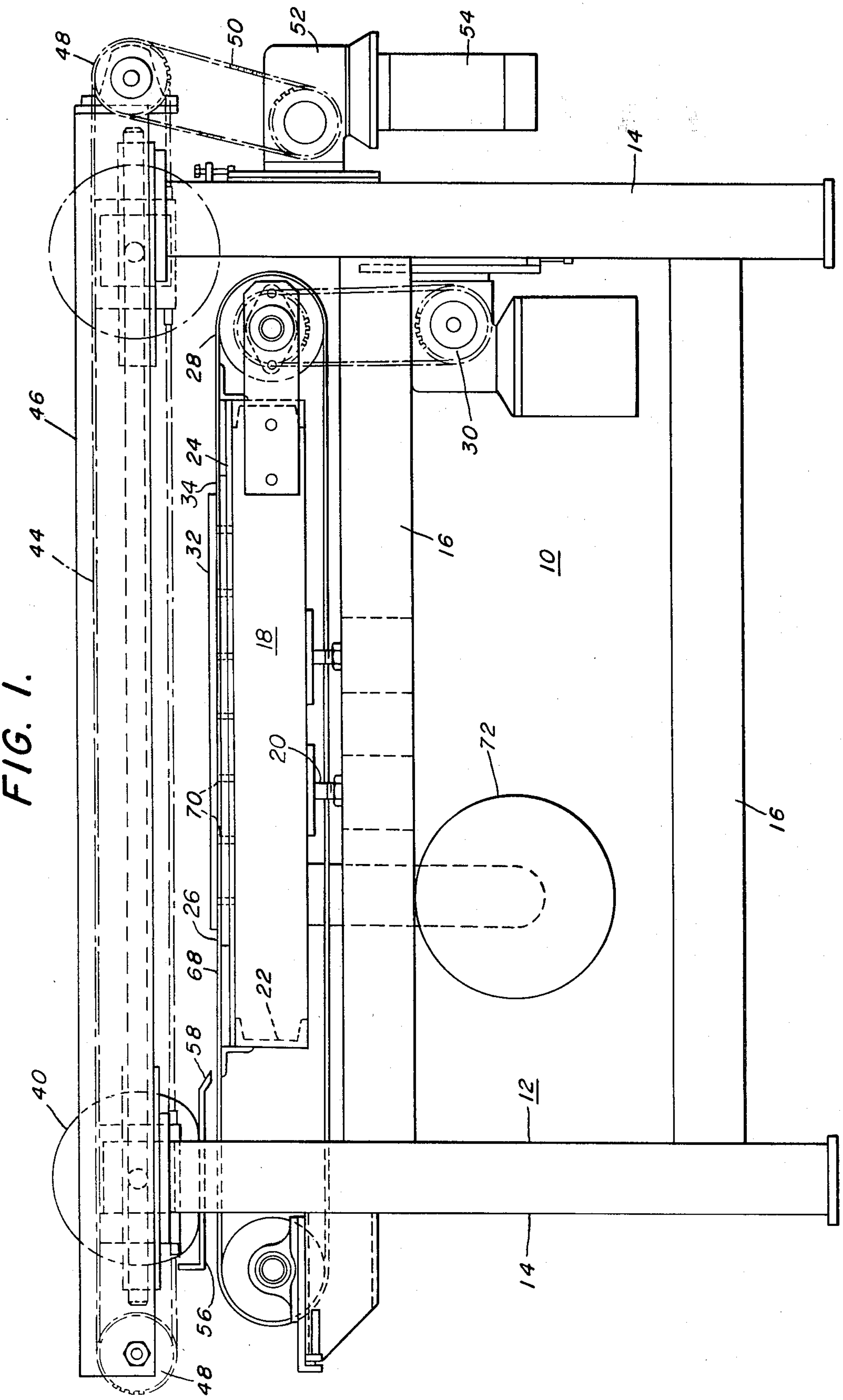
FIG. 1 is a side elevational view of the breakout apparatus of the present invention.

The invention can be best understood by reference to the exemplary embodiment shown in the drawings. The glass breakout apparatus 10 comprises a support frame 12 of four vertical members 14, which are connected together by upper and lower horizontal frame members 16 which extend between adjacent vertical members. A glass bracket support table 18 is horizontally disposed from and supported above the upper horizontal frame members 16 by means of a plurality of support rods 20. The support table 18 comprises a central horizontally disposed frame 22, upon which is preferably disposed a planar template support member 24, upon which a template 26 can be supported. An endless belt conveyor means 28 and drive means 30 are disposed about the central frame 22 of the support table 18 to facilitate handling of the glass bracket 32 which is supported on the top surface 34 of the endless conveyor means 28 for use.

Figure 2:
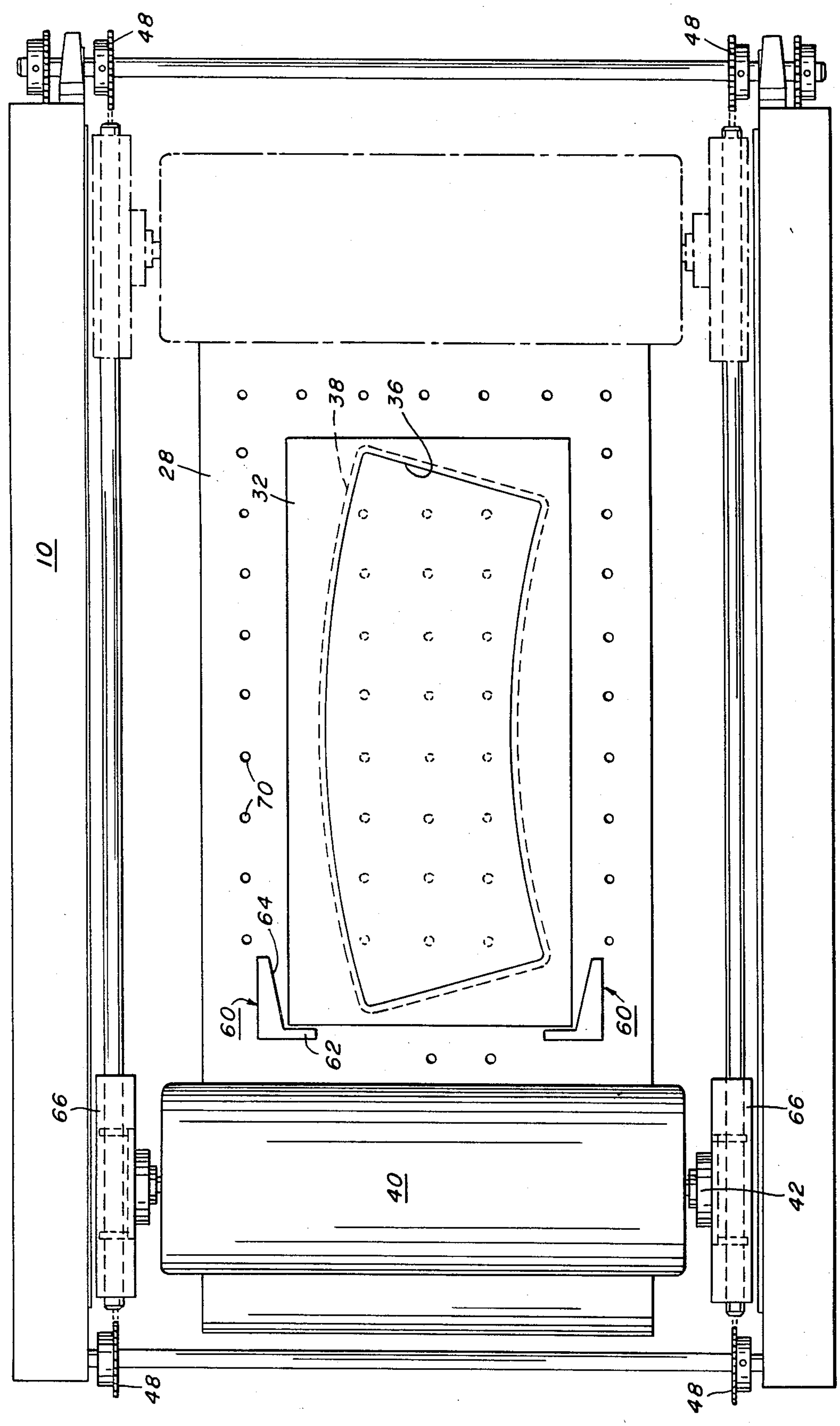
FIG. 2 is a plan view of the apparatus seen in FIG. 1.
Figure 3:
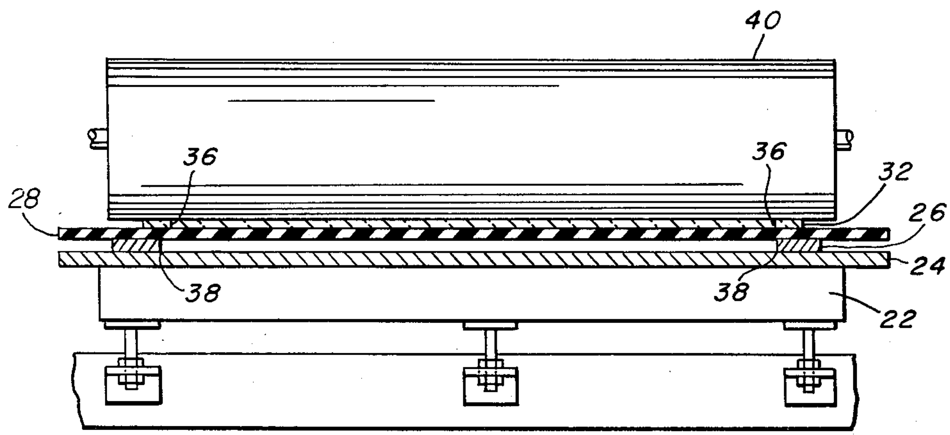
FIG. 3 is a partial end view partly in section of the support table portion of the present apparatus, showing the glass bracket with the pliable, weighted roller disposed thereon.

The glass bracket 32 is best seen in FIG. 2, wherein the bracket 32 has a rectangular configuration. The outline 36 of the scoring on the bracket 32 is clearly seen, and the outline 38 of the aperture of the template 26 is shown as the dotted line, the pattern of which is slightly larger than the score outline pattern 36 on the glass bracket 32.

A weighted, pliable, elongated roller means 40 is axially supported by bearing means 42 at each end of roller means 40, which bearing means 42 are connected by chain drive means 44 which move within a guide means 46 extending along the length of the support table. The chain drive means move about sprocket wheels 48 at each end of the guide means 46. One of the sprocket wheels 48 is driven by drive chain 50 which extends between sprocket wheel 48 and gear reducer 52 and drive motor 54. The pliable roller means 40 can thus be advanced by rolling back and forth along the length of the support table 18. A roller support platform 56 is preferably mounted from the vertical frame 14, above the support table 18 so that the roller means 40 is initially supported above the table 18 and the conveyor means 28. A ramp portion 58 is provided for platform 56 so that the roller means 40 can be readily moved into contact with the top surface of the conveyor means. The ramp portion 58 should be high enough above the conveyor belt to permit a glass bracket to pass under the ramp and support platform when the conveyor means is used to advance the broken-out glass bracket to the next processing position or apparatus in an in-line mode of operation.

Glass bracket alignment and positioning means 60 are indicated generally in FIG. 2 comprising stop members 62 which are movable into position just over the surface of conveyor means 28 for stopping the glass bracket 32 over the template 26. The stop members 62 can extend from overhead supports, not shown, and are movable down over the conveyor means to stop the glass bracket, at which time the vacuum hold-down system can be actuated. The stop members can then be raised out of the way of the travel path of the roller 40 until the next glass bracket is advanced. The stop members have converging inclined surface portions 64 which guide or direct the glass bracket into correct alignment. The stop members can also be easily moved into position from the sides of the conveyor means. The glass bracket is generally aligned in the center of conveyor means 28 when it is loaded thereon, and the converging inclined surface portions 64 of the stop members 62 serve to more accurately align the bracket. Any number of other alignment and positioning means well known in the art can be utilized in practicing the present invention. Such means can comprise positively acting guide members which are moved toward the center line of the conveyor as the glass bracket advances to urge the glass bracket to the centers of the conveyor means and including a positive end stop which stops the glass bracket over and in alignment with the template disposed therebelow. The drive means for the alignment and positioning means can comprise a simple air cylinder drive means.

Thus, for the embodiment shown in FIGS. 1 and 2, the glass bracket is advanced from right to left, and is accurately positioned upon the support table 18 above the nearly matching template 26.

The pliable roller means 40 is actuated when the glass bracket is positioned in place over the template. The roller means moves from left to right and back to the starting position after passing over the glass bracket. The cooperative action of the pliable roller means 40 applying a uniform pressure to the glass bracket and the supporting of the glass bracket proximate the prescored pattern by the template effects a breakout of the desired pattern. The action is similar to a hand breakout, and the edges of the resultant glass pattern are smooth and perpendicular as desired. A ramp and platform can also be provided at the opposite end of the support table, since the roller means 40 will also effect the breakout in a single pass, as from left to right in FIGS. 1 and 2. The roller means 40 would then roll onto the righthand platform which is not shown, and after the next glass bracet is advanced into position, the roller is actuated to move from right to left in breaking out the bracket. A single pass of the roller over the glass bracket is sufficient to effect the breakout.

The pliable roller means 40 will be described in greater detail by way of an example of the preferred structure. The roller means 40 preferably is formed as a relatively thin fluid-tight resilient housing 68 of rubberous material such as polyurethane, which is abrasion resistant and filled with fluid, which is for example water. The resiliency of the housing and fluid filling actually provides a sausage-like roller structure which sags at the central portion which passes over the central portion of the glass bracket. The dimensions of the roller of course depend upon the bracket size and thickness. Typically a roller of about 34 inches in length and about 10 inches in diameter has been found useful for breaking out 0.25 inch plate soda lime glass brackets which are about 23 inches wide. The fluid within the roller is sufficient to provide a weight of about 3 pounds per lineal inch along the length of the roller. The roller when filled with fluid exhibits a hardness of 25–30 durometers when tested with a Shore A hardness test apparatus. The roller should be longer than the width of the glass bracket to overlap the bracket and provide the proper bending moment for breaking out the glass pattern. The speed of movement of the roller across the glass bracket is not critical, and a lineal speed of about 1 second per foot has been found convenient.

While the roller has been described as being fluid filled, the fluid can be substituted for by finely divided solid material or pellets, which provide sufficient weight and resiliency for the roller.

The belt 68 of conveyor means 28 is a friction surface material which restrains the glass bracket in position when the roller is advanced over the bracket. It may be desirable to include a more positive restraining means for holding the glass bracket in place. Such a means is generally indicated in the drawings in that belt 68 has a plurality of apertures 70 provided therethrough and matching apertures are provided in the template and the template support. A vacuum suction means shown generally as 72 in FIG. 1 is connected to the frame 22 of table 18 to define a plenum chamber which has openings through the apertures 70, and thus a hold down suction can thus be applied to restrain the glass bracket in position.

Figure 4:
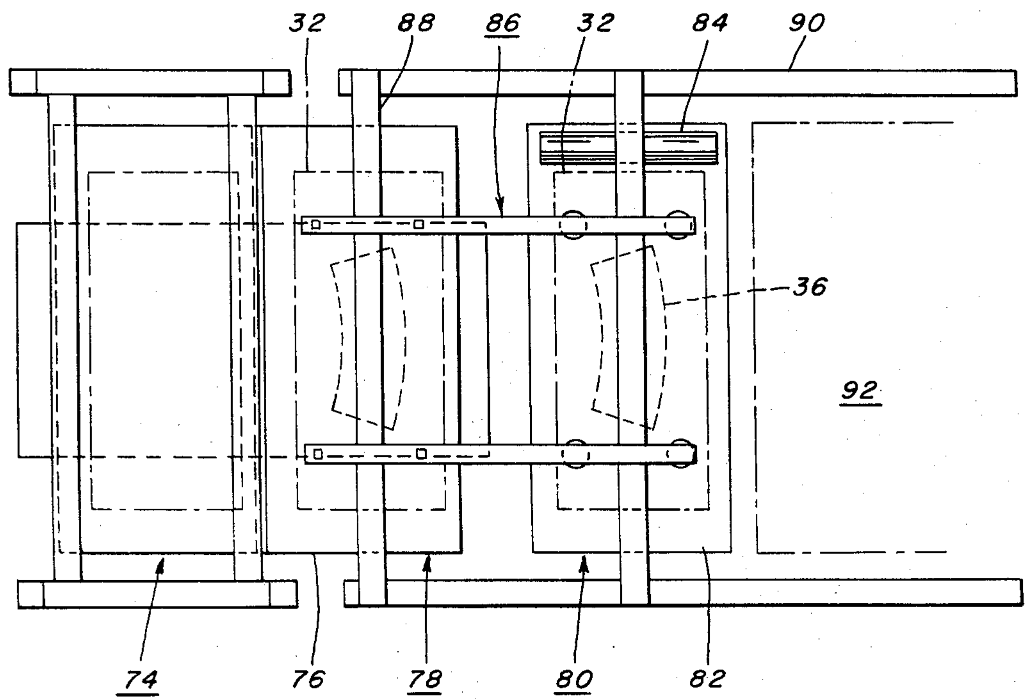
FIG. 4 is a schematic plan view of an embodiment of an overall glass handling system in which the breakout apparatus of the present invention is utilized.

Fig. 4 shows a schematic representation of a breakout apparatus of the present invention with glass bracket feed means and removal means. In this embodiment the glass bracket advances from left to right. The glass bracket is cut to the approximate size at automatic shape cutter table 74 which includes an integral vacuum hold-down system, which is conventional and was already described with respect to the breakout apparatus. An integral conveyor means 76 advances the glass bracket from cutter table 74 to stencil station 78 where the bracket is scored to the desired final pattern. Stencil station 78 also includes an integral vacuum hold-down system. The glass bracket is now ready to be transferred to the breakout apparatus 84 which is constructed basically as already described except that a conveyor means 82 is movable transverse to the direction of advance of the glass bracket, as is the disposition and movement of the pliable roller means 84. A vacuum cup glass transfer means 86 is disposed above the stencil station 78 and the breakout apparatus 80, whereby the glass bracket can be engaged and lifted, then shifted to the next station and deposited very accurately in place.

Such vacuum cup transfer means 86 is well known in the art and is shown schematically in FIG. 4. Such means generally comprise a plurality of vertical vacuum cup support arms depending from a movable carriage 88 which is vertically movable and transversely movable to effectuate transfer of the engaged glass bracket. Vacuum cup engagement means are provided at the extending ends of the support arms, which engagement means communicate with a vacuum system which is selectively actuated to effect engagement with the glass bracket. The carriage means 88 moves along the carriage support means 90 which extends from the stencil station 78 to a discharge station 92 beyond the breakout apparatus 80.

The glass bracket is loaded at the left-hand side of FIG. 4 onto the cutter table and, after the bracket is trimmed, it is advanced on conveyor 76 to the stencil station 78 where the desired pattern is scored on the bracket. The vacuum cup transfer means 86 is then actuated to engage the scored bracket, lift it, and transversely move it to the breakout apparatus 80. The glass bracket is set down accurately upon the breakout apparatus above the template and the transfer means 86 is lifted out of the way while the roller 84 is actuated to effect the breakout. Transfer means 86 is again actuated to engage the broken-out pattern, lifting it from conveyor 82 and moving it to discharge station 92 where the pattern is disengaged as by placing it on a further conveyor means. The conveyor 82 associated with the breakout apparatus 80 is movable transverse to the direction of glass breakout travel, as is the roller 84. Conveyor means 82 is actuated after the breakout pattern has been transferred therefrom, to remove the cullet or remaining glass from the bracket disposed thereon from the breakout apparatus for recycling.

In the embodiment described, the resilient support for the glass bracket comprised a conveyor means integral with the support table of the breakout apparatus. A stationary resilient support means can be utilized supported by the support table. Means would of course have to be provided for placing and removing the bracket from the resilient support means.

The apparatus and method described provides for the rotational movement of the roller over the restrained glass bracket to effect the breakout. It is of course possible to move the glass bracket workpiece relative to the roller, and pass the workpiece under the roller with sufficient force being exerted to effect breakout.

We claim:

1. Apparatus for breaking out a prescored glass pattern from a glass bracket which bracket is supported upon a template of the corresponding pattern, comprising:

a. a support table having a generally horizontal top surface with a template disposable thereon, which template is larger than the prescored pattern on the glass bracket;

b. resilient support means supported by the support table and disposed over the template to support the glass bracket;

c. glass bracket alignment and retaining means associated with the support table for positioning said glass bracket relative to the template upon the resilient support means; and d. a pliable, elongated, rotatable roller mounted above the support table, and coupled to means for moving the roller relative to the glass bracket to contact the roller and the glass bracket, with the roller rotatably passing over the prescored pattern whereby the glass will cleanly break along the prescored pattern.

2. The apparatus specified in claim 1, wherein a support platform is provided above the resilient support means to support said roller above the glass bracket permitting the glass bracket to freely pass under the roller and platform.

3. The apparatus specified in claim 2, wherein said support platform includes a ramp portion directed toward the resilient support means whereby the roller is rotatably movable from the support platform onto the resilient support means and glass bracket.

4. The apparatus specified in claim 3, wherein the means for moving the roller relative to the glass bracket comprise drive means coupled to bearings at each end of the roller for rotatably advancing the roller across the prescored pattern.

5. The apparatus specified in claim 4, wherein said drive means rotatably advances the roller across the prescored pattern and back to the initial roller position upon the roller support platform.

6. The apparatus specified in claim 1, wherein the resilient support means comprises an integral conveyor means which also advances the glass bracket into engagement with the alignment and retaining means.

7. The apparatus specified in claim 6, wherein the support table and integral conveyor means are perforated and a suction means is connected to the underside of the support table for retaining the glass bracket in position when the suction means is actuated.

8. The apparatus specified in claim 1, wherein the pliable elongated roller comprises a resilient housing which is filled with fluid.

9. The apparatus specified in claim 1, wherein the pliable elongated roller provides a breakout force of approximately three pounds per lineal inch of roller length.

10. The apparatus specified in claim 1, wherein the pliable elongated roller is mounted with its longitudinal axis transverse to the direction of travel of the glass bracket, whereby the roller is rotatably moved in the direction of glass bracket travel to effectuate the breakout.

11. The apparatus specified in claim 1, wherein means are provided for transferring the broken out pattern from the resilient support means, and wherein the resilient support means comprises an integral conveyor means upon which the remaining glass cullet is disposed, and which conveyor means is operative to remove the glass cullet for recycling after the broken out pattern has been removed.

12. Method of breaking out prescored glass from a glass bracket disposed upon a support member and a rigid template which is patterned larger than the prescored pattern on the glass bracket comprising;

forceably contacting the glass bracket with a rotatable weighted pliable elongated roller which is longer than the width of the glass bracket to flex the glass bracket relative to the template to sever the glass along the prescored lines.

13. The method specified in claim 12, wherein the roller is rotatably advanced across the glass bracket.

14. The method specified in claim 12, wherein the roller applies a force of about three pounds per lineal inch of roller length to the glass bracket.

* * * * *